US012596539B2

(12) United States Patent
Mantri

(10) Patent No.: US 12,596,539 B2
(45) Date of Patent: Apr. 7, 2026

(54) HIDING AND UNHIDING JAVA CARD APPLET INSTANCES

(71) Applicant: GIESECKE+DEVRIENT MOBILE SECURITY GMBH, Munich (DE)

(72) Inventor: Deepen Mantri, Munich (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 382 days.

(21) Appl. No.: 18/011,377

(22) PCT Filed: Jun. 15, 2021

(86) PCT No.: PCT/EP2021/025209
§ 371 (c)(1),
(2) Date: Dec. 19, 2022

(87) PCT Pub. No.: WO2021/254660
PCT Pub. Date: Dec. 23, 2021

(65) Prior Publication Data
US 2023/0236815 A1    Jul. 27, 2023

(30) Foreign Application Priority Data
Jun. 19, 2020    (EP) .................................... 20020287

(51) Int. Cl.
*G06F 8/61*        (2018.01)
*G06F 21/57*       (2013.01)

(52) U.S. Cl.
CPC .............. *G06F 8/61* (2013.01); *G06F 21/572* (2013.01); *G06F 2221/032* (2013.01)

(58) Field of Classification Search
CPC ..... G06F 8/61; G06F 21/572; G06F 2221/032
USPC .......................................................... 717/175
See application file for complete search history.

(56) References Cited

U.S. PATENT DOCUMENTS

| 7,278,582 | B1 * | 10/2007 | Siegel | ................... H04L 9/0897 |
| | | | | 235/487 |
| 9,262,035 | B1 * | 2/2016 | Gustafson | ............... G06F 9/451 |
| 10,708,761 | B1 * | 7/2020 | Yin | ........................ H04W 8/205 |
| 2006/0168588 | A1 * | 7/2006 | Bendapudi | ............. G06F 9/547 |
| | | | | 719/313 |
| 2006/0253848 | A1 * | 11/2006 | Mathieu | .................... G06F 8/61 |
| | | | | 717/168 |

(Continued)

OTHER PUBLICATIONS

"GlobalPlatform Card Specification, Version 2.2.1," Section 9.3, GlobalPlaform, Jan. 31, 2011, 40 pages.

(Continued)

*Primary Examiner* — Bradford F Wheaton
(74) *Attorney, Agent, or Firm* — Workman Nydegger

(57) ABSTRACT

Methods and devices are provided for installing and hiding applets onto smart cards devices. In a first step, a request for installing an instance of a first applet is received at the card device from an off-card entity. The request includes a first applet identifier. An applet instance is then installed with the first applet identifier in a registry of the card device's operating system. In a further step, a request for hiding the instance of the first applet identified by the first applet identifier is received at the card de-vice from the off-card entity. After receiving the hiding request, the smart card operating system finds the applet instance with the give applet identifier and hides it.

15 Claims, 5 Drawing Sheets

(56)            References Cited

U.S. PATENT DOCUMENTS

| | | | |
|---|---|---|---|
| 2009/0150236 A1* | 6/2009 | Price | G06Q 30/02 |
| | | | 705/1.1 |
| 2012/0233618 A1* | 9/2012 | Takeuchi | G06K 19/0723 |
| | | | 718/102 |
| 2013/0278622 A1* | 10/2013 | Sun | G06Q 20/325 |
| | | | 345/589 |
| 2014/0109243 A1* | 4/2014 | Ting | G06F 21/60 |
| | | | 726/30 |
| 2019/0335017 A1 | 10/2019 | Gibis | |
| 2021/0120399 A1* | 4/2021 | Auer | H04W 4/18 |

OTHER PUBLICATIONS

Extended European Search Report from corresponding EP Application No. 20020287.7, Oct. 6, 2020.
International Search Report from corresponding PCT Application No. PCT/EP2021/025209, Sep. 16, 2021.

* cited by examiner

100

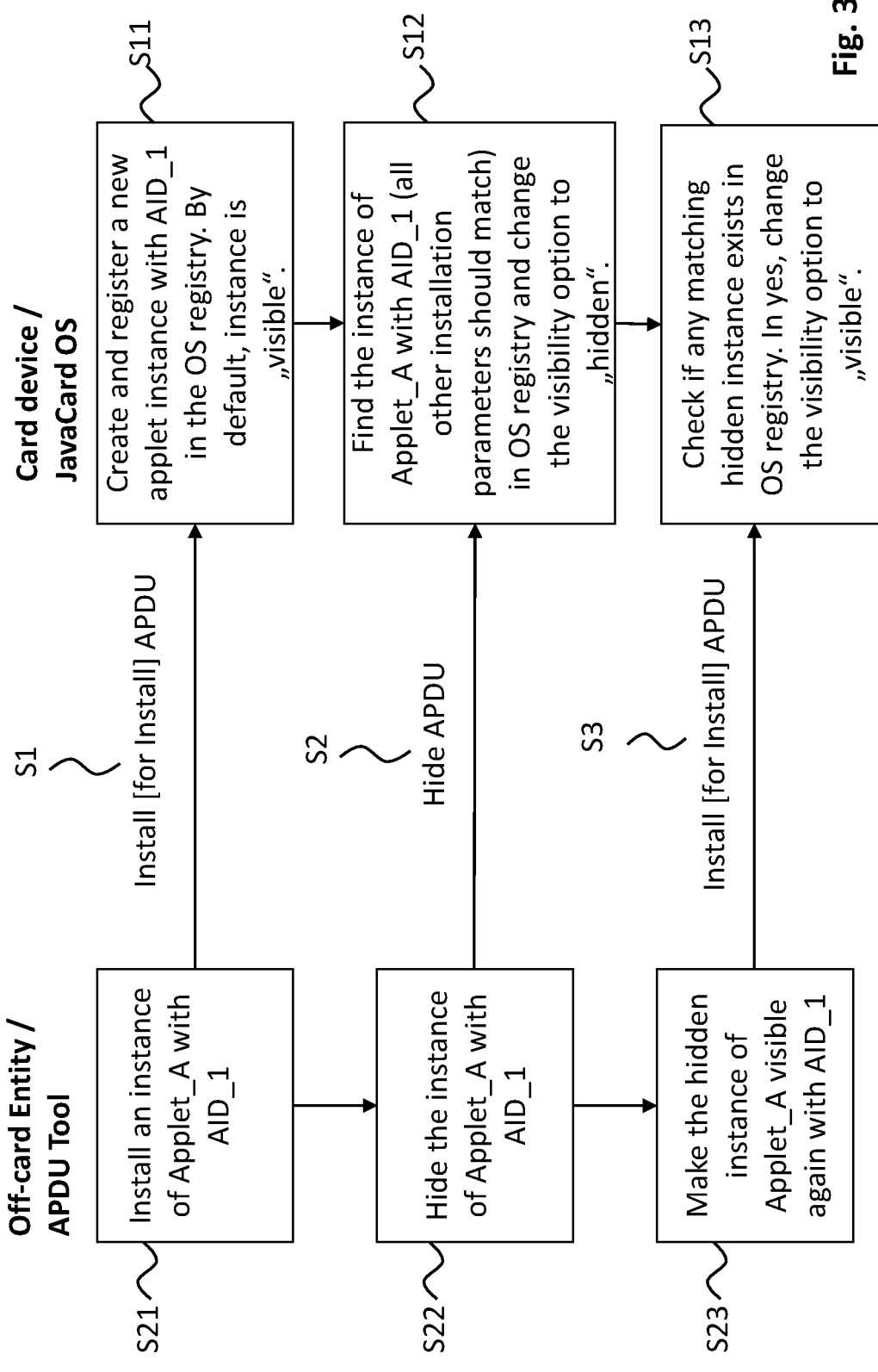

Card device / JavaCard OS

Create and register a new applet instance with AID_1 in the OS registry. By default, instance is „visible".  — S11

Find the instance of Applet_A with AID_1 (all other installation parameters should match) in OS registry and change the visibility option to „hidden".  — S12

Check if any matching hidden instance exists in OS registry. In yes, change the visibility option to „visible".  — S13

Install [for Install] APDU  — S1

Hide APDU  — S2

Install [for Install] APDU  — S3

Off-card Entity / APDU Tool

Install an instance of Applet_A with AID_1  — S21

Hide the instance of Applet_A with AID_1  — S22

Make the hidden instance of Applet_A visible again with AID_1  — S23

Fig. 3

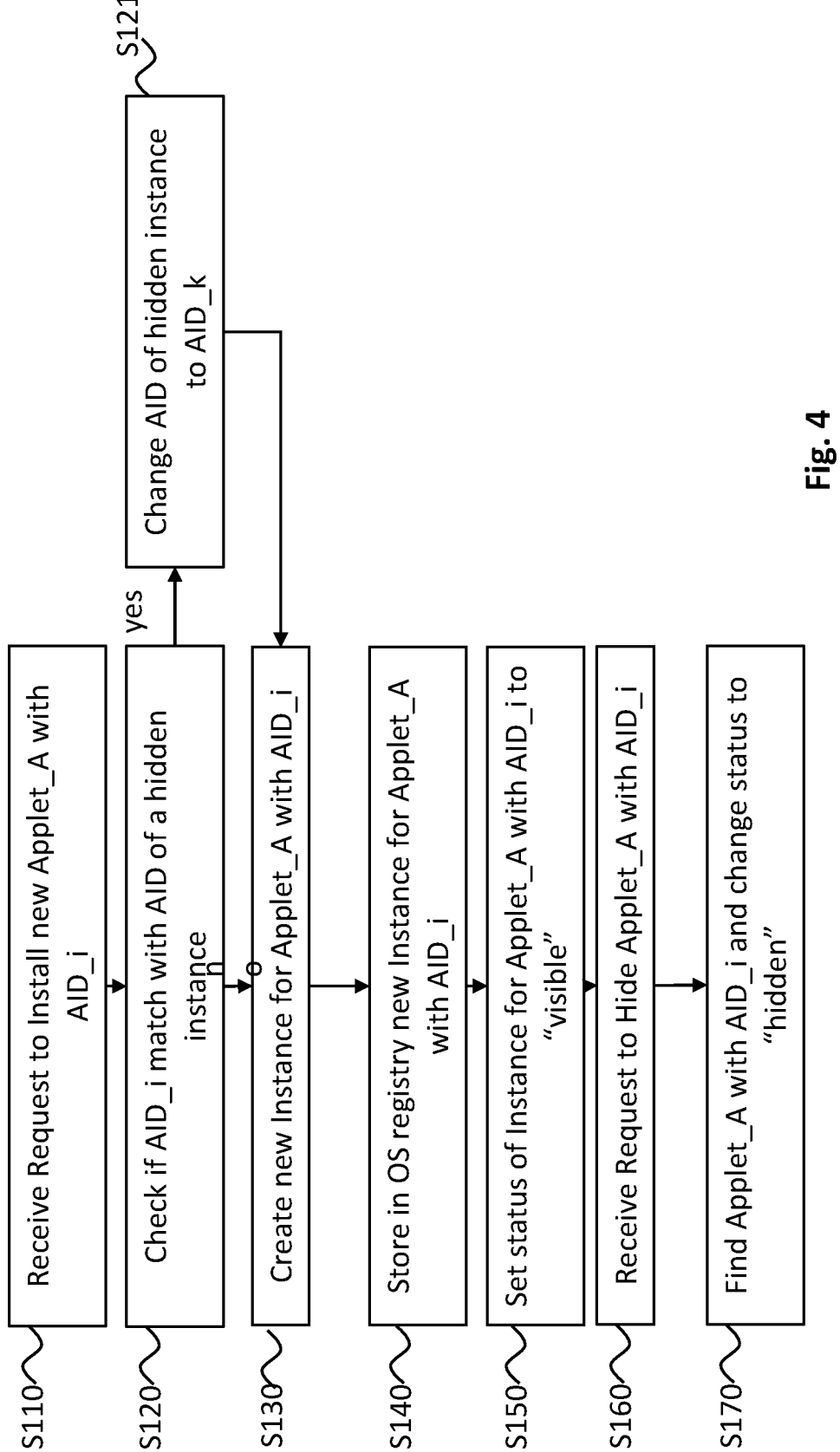

S110 — Receive Request to Install new Applet_A with AID_i

S120 — Check if AID_i match with AID of a hidden instance

S121 — Change AID of hidden instance to AID_k yes

S130 — Create new Instance for Applet_A with AID_i

S140 — Store in OS registry new Instance for Applet_A with AID_i

S150 — Set status of Instance for Applet_A with AID_i to "visible"

S160 — Receive Request to Hide Applet_A with AID_i

S170 — Find Applet_A with AID_i and change status to "hidden"

Fig. 4

HIDING AND UNHIDING JAVA CARD APPLET INSTANCES

The present invention relates to smart cards in general and in particular to methods and devices for installing and hiding applications onto smart cards. Particularly, the smart card can be based on the Java Card technology and can be a payment transaction card or a SIM (Subscriber Identity Module) card device for mobile communication of any form factor, implying plug-in SIM cards and embedded eUICCs for fixed mounting into a mobile device.

BACKGROUND OF THE INVENTION

Java Card technology enables secure elements, such as smart cards and other tamper-resistant security chips, to host applications (applets) which employ Java technology. Java Card offers a secure and interoperable execution platform that can store, update and run multiple applications on a single resource-constrained device, while retaining the highest certification levels and compatibility with standards.

The GlobalPlatform Card Technology Specification sets up a global standard for cards and/or secure elements issuers that shall be implemented on smart cards. In particular, the GlobalPlatform Card and API specification define a card management framework which complements the Java Card specification by defining a set of commands that can be used to manage applications on a Java Card product.

Based on the GlobalPlatform technologies, multi-application product lines have been put forward, as for example Giesecke+Devrient's Convego® Join, which allows to implement and combine value-added applications onto smart cards, such as, loyalty schemes, transport apps, and authentication solutions.

Manufacturing a smart card usually involves an initialization and a personalization process. During the initialization process, an integrated circuit chip is embedded into the plastic card body. The chip is loaded with at least one application program, such as a credit or a stored value application. After a card is initialized, it is then typically personalized. During personalization, the smart card is generally loaded with data that uniquely identifies the card, and with data that allows the card to be used for example in a payment system. Personalization data may include file information, application information, a personal identification number (PIN) or other cardholder information. Further information may be included, such as the currency in which the card or application is valid, the expiration date of the card or application, and a variety of cryptographic keys and algorithm information for the card or applications on the card.

Card personalization amounts to one of the major cost components in the production of smart cards. In particular, the personalization process duration is a critical factor, as it requires loading a significant amount of data into the Java Card memory during personalization.

In particular, it is currently observed that installation of Java Card payment applets on top of the Convego® Join Operating System (OS) consumes a substantial amount of the secure element's CPU execution time, notably between 1 to 2 seconds. This execution time is beyond acceptable limits and has to be reduced significantly.

It is therefore desirable to provide a solution for a time-efficient personalization of a Java Card that overcomes the above-mentioned drawbacks.

SUMMARY OF THE INVENTION

The present invention addresses the above object by the subject-matter covered by the independent claims. Preferred embodiments of the invention are defined in the dependent claims.

According to a first aspect of the present invention, there is provided a method for installing applet instances in a card device, the card device comprising an operating system, OS. The method comprises in a step receiving from an off-card entity a request for installing an instance of a first applet, the request for installing comprising a first applet identifier, AID. In a subsequent step, an applet instance with the first applet identifier is installed in a registry of the OS. In a further step, a request, sent from the off-card entity, for hiding the instance of the first applet identified by the first applet identifier is received at the card device. Subsequently, the applet instance identified by the first applet identifier is hidden on the card device.

The proposed method provides an efficient solution to time-saving personalization of a Java card, since it allows to install several applet instances for frequently used applications in the Java card before the personalization is actually performed. Since at this time it is not known which applet instances will be needed/used later during personalization of the card, these applet instances are, after having been installed, "hidden" in the card. A hidden applet instance is physically present on the card device, however not visible from outside. That is, the card device or secure element will not reveal the presence of a hidden applet instance, when requested. Later on, when personalization of the card is affected, and decided which applet instances to be used, the corresponding already installed hidden applet instances can be unhidden and made visible, and directly used during personalization, without having to upload and install a complete applet instance unto the Java card.

In some embodiments of the present invention, the method further comprises receiving from the off-card entity a further request for installing an instance of a second applet, the further request comprising a second applet identifier, wherein the second applet is different from the first applet; checking whether the second applet identifier matches the applet identifier of one of the hidden applet instances; if the second applet identifier matches the applet identifier of one of the hidden applet instances, changing the applet identifier of the hidden applet instance to a new applet identifier; and installing the instance of the second applet with the second applet identifier in the registry of the OS.

This allows to install in the card device, before personalization, several new instances of different applets, while avoiding an applet identifier conflict, that may arise due to already hidden applet instances with the same AID. As no two applet instances can have the same AID, the OS will usually not allow installation of two applet instances with the same AID.

In some embodiments of the present invention, the method further comprises receiving from the off-card entity a request for installing an instance of a third applet, the request comprising a third applet identifier identifying the instance of the third applet; checking whether there is a hidden applet instance of the third applet installed in the card device; checking whether the applet identifier of the hidden applet instance matches the third applet identifier; and if the applet identifier of the hidden applet instance matches the third applet identifier, unhiding the hidden applet instance.

This allows during personalization, when a request is received to install a new applet instance, to find, disclose and reuse a suitable hidden applet instance, instead of creating a new one from scratch. This intelligent reuse saves crucial production time, thereby increasing production throughput. In particular, disclosing and reusing applet instances consumes between 0.1-0.2 seconds which is an on average 80% improvement over applet installation from scratch.

Preferably, if the applet identifier of the hidden applet instance differs from the third applet identifier, the applet identifier of the hidden applet instance is changed to the third applet identifier before unhiding the hidden applet instance.

Preferably, if there is no hidden applet instance of the third applet in the card device, the instance of the third applet is installed with the third applet identifier in the card device.

The number of applets, first, second, third applet, are given as examples. The invention is not restricted to 3 different applets. It is generic and applies to any number of different applets within a card device.

Preferably, the request for installing an instance of an applet comprises further installation parameters.

In some embodiments of the present invention, installing an applet instance with an applet identifier in the card device comprises creating a new applet instance, and storing in the OS registry the new applet instance with the applet identifier and preferably installation parameters received from an off-card entity.

By default, upon installing an applet instance the status of the newly installed applet instance should be "visible", meaning that the applet instance is visible from outside and the applet instance can be accessed and selected upon request. Alternatively, the step of installing an applet instance with an applet identifier in the card device may comprise explicitly setting a status of the applet instance to visible.

In some embodiments of the present invention, the request for hiding an instance of an applet comprises further installation parameters and checking whether there is a corresponding visible applet instance installed in the card device for the applet comprises further checking whether the received installation parameters match installation parameters which were received with a request for installing the corresponding applet instance.

This ensures that when an instance of an applet is to be hidden, the selected installed applet instance is a correct match, and no unrelated installed applet instance is wrongly hidden.

Preferably, hiding an installed applet instance comprises setting a status of the applet instance to hidden. A hidden applet instance is physically present on the card device, however not visible nor selectable (i.e, accessible) from outside.

Preferably, the request for installing an instance of a third applet comprises further installation parameter for the third applet, and wherein checking whether there is a hidden applet instance of the third applet installed in the card device comprises further checking whether the received installation parameters match installation parameters which were received with a request for installing the hidden applet instance.

This ensures that, during personalization, a request for installing a new applet instance is sent by the off-card entity and received at the card device with exactly the same installation parameters like the ones used to install the hidden applet instance. This check can be implemented in the card device or in the off-card entity. Only a hidden applet instance exactly matching a new applet instance to be installed can thus be unhidden and used, avoiding therefore the use of a wrong applet instance during personalization.

Preferably, unhiding a hidden applet instance comprises changing the status of the applet instance from hidden to visible.

According to a second aspect of the present invention, a card device is provided. The card device comprises a card operating system, OS, and is configured to receive from an off-card entity a request for installing an instance of an applet, the request comprising an applet identifier, and to install an applet instance with the received applet identifier in a registry of the OS. Further, the card device is configured to receive from the off-card entity a request for hiding the instance of the applet identified by the applet identifier, and to hide the applet instance identified by the applet identifier.

Preferably, the card device is further configured, upon receiving from the off-card entity the request for hiding an instance of an applet installed in the OS registry, to apply to the applet instance a HIDE command to change a status of the applet instance from visible to hidden.

In some embodiments of the present invention according to the second aspect, the card device is further configured, upon receiving from the off-card entity the request for installing an instance of an applet, to check whether the received applet identifier matches an applet identifier of one of the hidden applet instances. If the received applet identifier matches the applet identifier of one of the hidden applet instances, the applet identifier of the hidden applet instance is changed to a new applet identifier, and the instance of the requested applet to be installed is installed with the applet identifier in the OS registry. Preferably, the card device is further configured to set a status of the installed applet instance to visible.

Preferably, the card device according to the second aspect is further configured to perform the method according to the first aspect and/or the embodiments of the first aspect.

According to a third aspect of the present invention, an Application Protocol Data Unit, APDU, Hide command is provided. The APDU Hide command comprises a data field for transferring an applet identifier, AID, of an applet instance to be hidden on a card device and is configured to cause the card device upon applying the command to change the status of an installed applet instance from visible to hidden.

This provides a proprietary interface, which allows to install hidden applet instances in a card device.

Preferably, both the method according to the first aspect of the present invention and the card device according to the second aspect of the present invention implement the request for hiding an instance of an applet by the APDU Hide command according to the third aspect.

It has to be noted that all the devices, elements, units and means described in the present application could be implemented in software or hardware elements or combination thereof. All steps which are performed by the various entities described in the present application as well as the described functionalities are intended to mean that the respective entity is adapted to or configured to perform the respective steps and functionalities.

Further aspects, features and advantages of the present invention will become apparent to those of ordinary skill in the art upon reviewing the following detailed description of preferred embodiments and variants of the present invention in conjunction with the accompanying figures.

BRIEF DESCRIPTION OF THE DRAWINGS

Reference will now be made to the accompanying figures, in which

5

Figure 1:
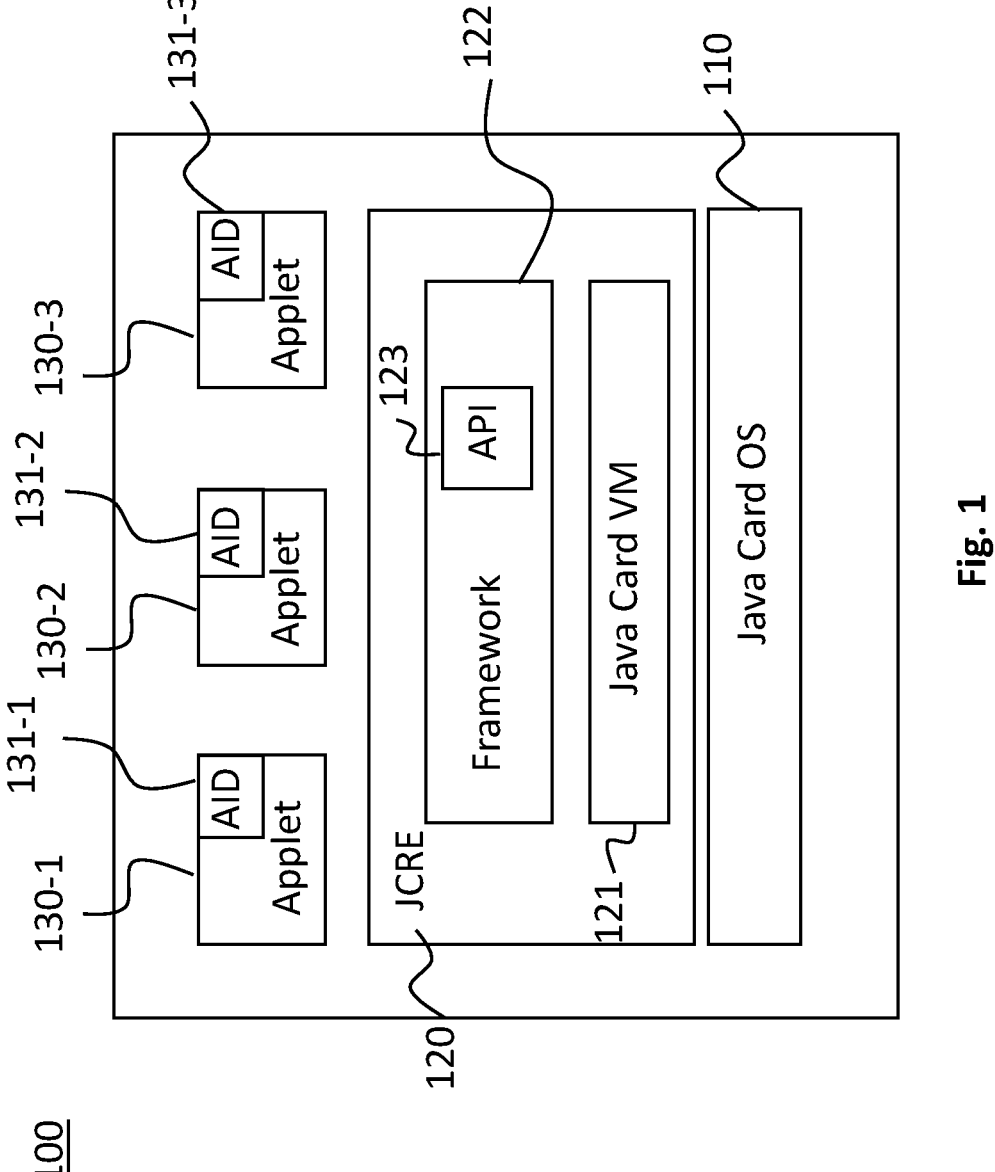
Figure 2:
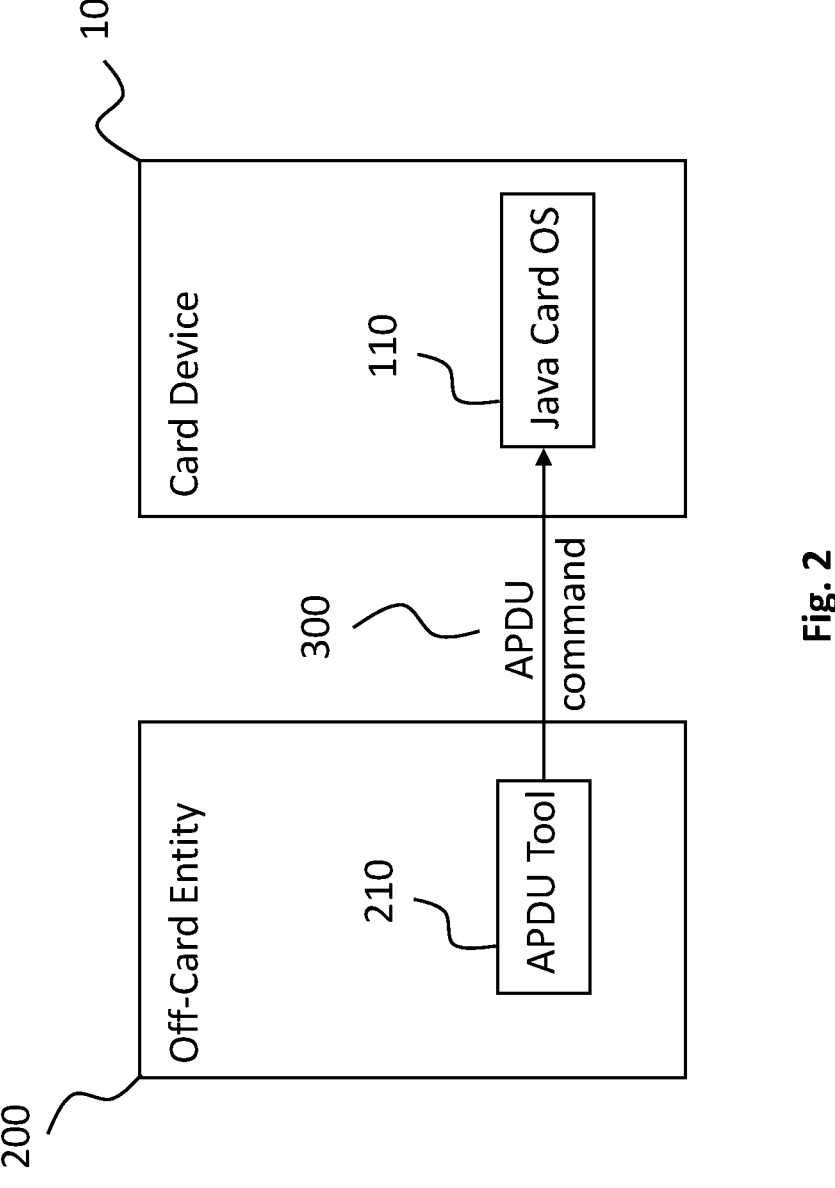
Figure 5:
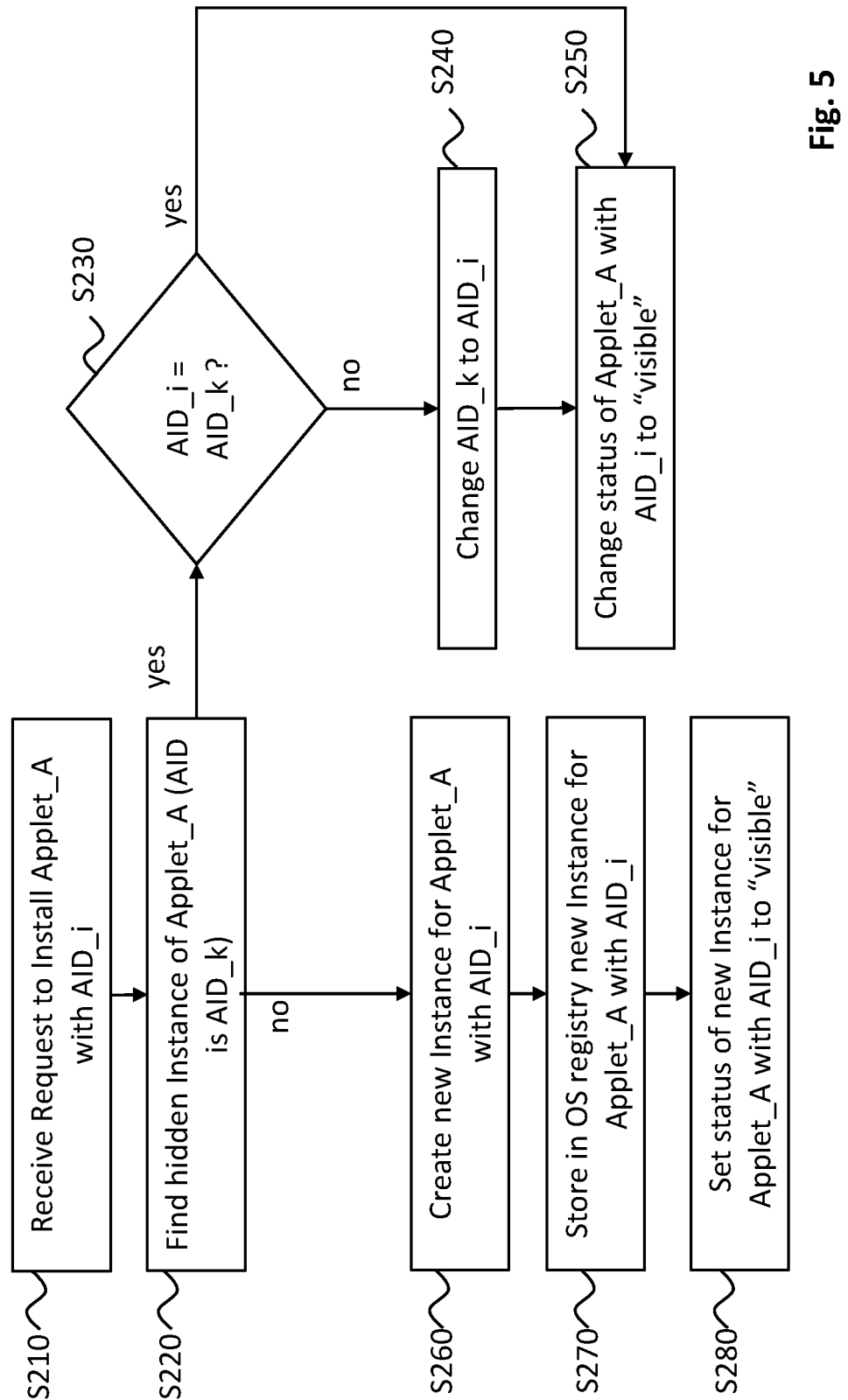

FIG. 1 illustrates components of a Java technology smart card;

FIG. 2 illustrates the interaction between an off-card entity and a Java smart card;

FIG. 3 illustrates a method for hiding and unhiding Java card applet instances according to an embodiment of the invention;

FIG. 4 illustrates a method for installing hidden applet instances before card personalization according to an embodiment of the invention;

FIG. 5 illustrates a method for disclosing and re-using hidden applet instances during card personalization according to another embodiment of the invention.

DETAILED DESCRIPTION OF VARIOUS EMBODIMENTS

Detailed explanations of the present invention are given below with reference to attached drawings that illustrate specific embodiment examples of the present invention. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the scope of the present invention. In addition, it is to be understood that the position or arrangement of individual elements within each disclosed embodiment may be modified without departing from the scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views. Through this specification, the expressions "Java Card", "card device" and "secure element" are used interchangeable.

FIG. 1 illustrates software components of a Java technology smart card 100 (i.e., Java card, card device, secure element). The card device 100 comprises a card operating system (OS) 110, a Java card runtime environment (JCRE) 120 and a plurality of applets 130 (130-1, 130-2, 130-3), which are programs or applications written in Java programming language for use on the smart card. The JCRE 120 includes a Java Card Virtual Machine (VM) 121, which provides bytecode execution and Java language support for handling Java Card applications or applets, and a framework 122, which is a set of classes implementing the API 123. The Application Programming Interface (API) 123 defines the calling conventions by which an applet 130 accesses the JCRE.

Associated with each applet 130 on smart card 100 is an Application Identifier (AID) 131 (131-1, 131-2, 131-3). The AID is a byte string up to 16 bytes long, whose format is defined by International Standard ISO/IEC 7816-5 and is used to uniquely identify an applet instance.

FIG. 2 shows schematically the interaction between an off-card entity 200 and the card device or secure element 100 of FIG. 1.

The off-card entity 200 comprises and APDU Tool 210 for sending APDUs (Application Protocol Data Units) commands to the Java Card OS 110 of the card device 100. Applets are loaded into a card device by means of APDU commands, as specified in the Global Card Platform Specification. In particular, an applet is installed in a card device by loading a load packet for the applet into the card device with the LOAD command, while an instance of the applet is installed in the card device with an INSTALL (Install [for Install] APDU) command. The Install [for Install] APDU is described in the GlobalPlatform Card Specification, according to which the AID of an applet instance to be installed is transferred in the data field of the INSTALL command, notably in the sub-field "Application AID". A further sub-field, the "Install Parameters field" carry installation parameters. In particular, installation parameters comprise application specific parameters, system specific parameters, and control parameters.

During real-life production, card personalization usually requires loading and installing a significant amount of data into the Java Card memory, increasing thus the overall personalization time.

The present invention proposes a solution to time-saving personalization of a Java card. To have to transfer less data at personalization time, several applet instances for frequently used applications are installed in the Java card before the personalization is actually performed. As at this time it is not known which applet instances will be needed/used later on during personalization of the card, these applet instances are, after having been installed, "hidden" in the card. A hidden applet instance is physically present on the card device, however not visible and not directly accessible from outside. That is, the card device or secure element will not reveal the presence of a hidden applet instance, when requested. Later on, when personalization of the card is affected, and decided which applet instances to be used, the corresponding already installed hidden applet instances are made visible. In this case, there is no need to upload or create a complete applet instance unto the Java card, but only to unhide an already installed hidden applet instance. This process of installing, hiding, and unhiding applet instances leads to a reduction of personalization or applet installation time for up to 80% over the conventional approach.

FIG. 3 illustrates the overall method for installing, hiding and unhiding Java Card applet instances according to an embodiment of the invention. Detailed steps for installing and hiding applet instances before card personalization are described with reference to FIG. 4, while detailed steps for disclosing/unhiding and re-using hidden applet instances during card personalization are described with reference to FIG. 5.

With reference to FIG. 3, in a first step S1, the card device 100 receives from an off-card entity 200 a request for installing an instance of a first applet, the applet instance being uniquely identified by a first applet identifier, AID. The request is generated, S21, by the APDU Tool 210 in the off-card entity 200 and send through the APDU command "Install [for Install]" to the card device 100. For instance, the request is for installing an "instance of Applet_A with AID_1".

Upon receiving the request, the card device 100 creates and registers in the operating system, OS, 110 a new applet instance with AID_1 (step S11). By default, the status of this instance is "visible". Alternatively, the status can be explicitly set to "visible". For specifying the visibility status of an applet instance, a Boolean flag associated with each applet instance, e.g., "0" indicating "hidden" and "1" indicating "visible", can be used. Other implementations are also possible, for example managing a list of visible applet instances. Applet instances can be stored in a registry of the OS.

In a further step, S2, the card device 100 receives from the off-card entity 200 a request for hiding the instance of the first applet identified by the first applet identifier. As with the installing request, this request for hiding an applet instance is generated by the APDU Tool 210 in the off-card entity 200 (step S22) and send through the APDU command "Hide" to the card device 100. For instance, the request is for hiding the "instance of Applet_A with AID_1".

Upon receiving the request, the card device 100 finds the instance of Applet_A with AID_1 in the OS registry and change the visibility option/status of the found applet instance from "visible" to "hidden".

Steps S1 and S2 described above allow to install and hide several applet instances before card personalization, as will be described in detail below, with reference to FIG. 4.

During the personalization process, to make a hidden applet instance visible, an Install [for Install] APDU is generated, S23, by the off-card device 200, and sent to the Java card 100 in step S3. Upon receiving the request, it is checked, S13, whether there exists any matching hidden instance in the OS registry. If a matching applet instance is found, the applet instance in unhidden, that is, its visibility option/status is changed from "hidden" to "visible". Further details of this unhiding process are given below with reference to FIG. 5.

FIG. 4 illustrates a preferred implementation of the steps for installing (S1 in FIG. 3) and hiding (step S2 in FIG. 3) several applet instances before card personalization.

When an instance of a new applet (Applet_A) is to be installed with an applet identifier (AID_i) S110, under the assumption that instances of at least a different applet have already been installed and hidden in the card device, it is first checked S120 whether the received AID_i match with an applet identifier of a hidden applet instance. If this is the case, the applet identifier of the matching hidden instance will be changed S121 internally, that is, in the OS registry, to a new applet identifier, e.g., AID_k. After the change is affected, a new instance for Applet_A is created S130, and stored S140 together with AID_i in the OS registry.

In this way, an AID conflict is avoided, and both applets' instances can be installed in the OS registry. Otherwise, the card device OS will not allow installation of two applet instances with the same AID.

After the new instance for Applet_A with AID_i has been stored in the OS registry, the status of this instance is set to "visible" (S150). Alternatively, the status can be specified to be by default "visible" upon storing the instance. For specifying the visibility status of an applet instance, a Boolean flag associated with each applet instance, e.g., "0" indicating "hidden" and "1" indicating "visible", can be used. Other implementations are also possible, for example managing a list of visible applet instances and a list of hidden applet instances.

With respect to the overall method described in FIG. 3, step S11 of FIG. 3 is preferably implemented by steps S120, S130, S140, and S150 of FIG. 4.

After a new instance for an applet has been installed in the card, a request to hide the applet instance is received in step S160. The card's OS finds the corresponding matching instance of Applet_A with AID_i and changes the status to "hidden", S170.

Steps S160 and S170 are a preferred implementation of step S12 in FIG. 3.

The method illustrated in FIG. 4 allows to install several hidden Java Card applet instances within the secure element, before personalization begins. These hidden instances are either part of the OS image that is flashed masked in the secure element's programmable memory or can be installed before the personalization step begins (e.g. during a card initialization step).

FIG. 5 illustrates a preferred implementation of the step for un-hiding and reusing hidden applet instances (S3 in FIG. 3) during card personalization.

During personalization, to make a hidden applet instance visible, the Install [for Install] APDU is sent by the off-card entity 200 to the card device 100. The request contains the applet identifier, AID among other fields, such as applet name and installation parameters.

At the card device, upon receiving the request for installing Applet_A with AID_i in step S210, a suitable hidden applet instance is searched in the OS registry, S220. If a matching hidden applet instance is found, in a further step S230 the card device checks whether the AID, AID_k, of the hidden applet instance corresponds to the received AID, that is, whether AID_k=AID_i. This step is performed, since during installation of the hidden applet instance its original AID might have internally changed to avoid a potential AID conflict with other hidden applet instances.

If the AID of the matching hidden applet instance differs from the AID applet instance to be installed, the applet identifier of the matching hidden applet instance is changed back to the received AID, AID_i, in step S240, after which the hidden applet instance is made visible in step S250.

If the applet identifier of the hidden applet instance corresponds to the received AID_i, step S240 is skipped and step S250 is directly performed, by changing the status of the matching hidden applet instance to "visible".

If there is no hidden applet instance matching the new applet to be installed, an instance of this new applet will be installed from scratch. This includes, creating S260 and storing S270 a new instance for Applet_A with AID_i in the OS registry. Preferably, the status of this applet instance is by default "visible". Alternatively, the status can be set to "visible" in a further step S280.

According to the implementation details described above for the step for hiding an applet instance before card personalization (S12), as well as for the step for unhiding an applet instance during card personalization (S13), it is checked whether there is a corresponding visible/hidden applet instance installed in the card device for the applet instance (S120, S170, S220).

In addition to checking the AID (and possibly the applet name) of the applet instance against already installed applet instances, a further check can be performed to detect whether installation parameters match. Preferably, the request for installing an instance of an applet and/or the request for hiding an instance of an applet comprises further installation parameters, and wherein checking whether there is a corresponding hidden and/or visible applet instance installed in the card device for the applet comprises further checking whether the received installation parameters match installation parameters which were received with a request for installing the corresponding applet instance.

Such an additional check can be implemented in the steps S120, S170, S220 described above. To support a comparison of installation parameter used to install applet instances, installation parameters can be stored in the OS registry together with the applet identifier for each applet instance installed in the card device.

By the above-described method, during personalization when a request is received to install a new applet instance, a suitable hidden instance is found, disclosed, that is, made visible, and reused instead of creating a new one from scratch. This intelligent re-use saves crucial production time, thereby increasing production throughput.

Installing visible applet instances in a secure element or card device can be done via a standard interface, such as GlobalPlatform's Install [for Install] APDU command. However, there is no standard interface that supports installation of hidden applet instances within the card device.

Therefore, in a second aspect of the present invention, a proprietary APDU command is proposed. After receiving such an APDU, secure element's OS will find the applet instance with the given AID and hide it. Preferably, the APDU command "Hide AID_i" comprises a data field for transferring an applet identifier, AID_i, of an applet instance to be hidden on a card device 100. The Hide APDU is configured to cause the card device 100 upon applying the command to change the status of an installed applet instance, identified by AID_i, from visible to hidden.

The request for hiding an instance of an applet sent in step S2 by the off-card entity to the card device (as depicted in FIG. 3) can be implemented by the APDU Hide command described above.

In a further aspect of the present invention, the card device 100 in FIG. 2 is configured to perform the method according to the first aspect of this invention, as illustrated in FIGS. 3, 4 and 5. Furthermore, the card device 100 is configured, upon receiving from the off-card entity 200 the request for hiding an instance of an applet installed in the OS registry, to apply to the applet instance the APDU Hide command according to the second aspect of the present invention for changing a status of the applet instance from visible to hidden.

The above embodiments for installing, hiding and unhiding Java Card applet instances of the present invention provide several advantages due to the reduced data transfer at personalization time. In particular:

Significant improvement of secure element's execution time while personalizing it during real-life production. Execution time of applet installation improves by almost 80%.

Direct monetary gains due to reduction in overall personalization time of secure element. For instance, if one second is gained for personalizing one smart card, for one million payment cards the personalization time reduces to 12 days.

No change required whatsoever in the existing production set-up (especially production software).

To avoid an increase in memory consumption caused by installing several applet instances compared to the conventional approach of uploading applet instances only when needed, applet instances to be uploaded before personalization are selected based on criteria such as frequency of use or use case relevance.

In the foregoing specification, the invention has been described with reference to specific embodiments thereof. It will, however, be evident that various modifications and changes may be made thereto without departing from the broader scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for installing applet instances in a card device, the card device comprising an operating system, OS, and able to receive several applet instances, wherein the method comprises the steps of:

receiving from an off-card entity a request for installing an instance of a first applet, the request for installing comprising a first applet identifier;

installing an applet instance with the first applet identifier in a registry of the OS;

receiving from the off-card entity a request for hiding the instance of the first applet identified by the first applet identifier;

hiding the applet instance identified by the first applet identifier;

receiving from the off-card entity a request for installing an instance of a third applet, the request comprising a third applet identifier identifying the instance of the third applet;

checking whether there is a hidden applet instance of the third applet installed in the card device;

checking whether the applet identifier of the hidden applet instance matches the third applet identifier; and if the applet identifier of the hidden applet instance matches the third applet identifier, unhiding the hidden applet instance;

wherein the hidden applet instance is physically present in the card device but not visible or selectable from outside the card device due to the card device not revealing a presence of the hidden applet instance when requested;

the method further comprising maintaining, in the registry of the OS, for each installed applet instance a visibility status flag having values "visible" and "hidden";

wherein the hiding the applet instance identified by the first applet identifier further comprises setting the visibility status flag of the applet instance to identified by the first applet identifier "hidden," such that the card device does not reveal a presence of the hidden applet instance in response to queries.

2. The method according to claim 1, further comprising:

receiving from the off-card entity a further request for installing an instance of a second applet, the further request comprising a second applet identifier, wherein the second applet is different from the first applet;

checking whether the second applet identifier matches the applet identifier of at least one hidden applet instance;

if the second applet identifier matches the applet identifier of one or at least one hidden applet instance, changing the applet identifier of the hidden applet instance to a new applet identifier; and installing the instance of the second applet with the second applet identifier in the registry of the OS.

3. The method according to claim 1, further comprising:

if the applet identifier of the hidden applet instance differs from the third applet identifier, changing the applet identifier of the hidden applet instance to the third applet identifier and unhiding the hidden applet instance.

4. The method according to claim 1, further comprising:

if there is no hidden applet instance of the third applet, installing the instance of the third applet with the third applet identifier in the card device.

5. The method according to claim 1, wherein the request for installing an instance of an applet comprises further installation parameters, and wherein installing an applet instance with an applet identifier in the card device comprises:

creating a new applet instance;

storing in the OS registry the new applet instance with the applet identifier and the installation parameters received from the off-card entity; and setting a status of the applet instance to visible.

6. The method according to claim 5, wherein the request for hiding an instance of an applet comprises further installation parameters, and wherein checking whether there is a corresponding visible applet instance installed in the card device for the applet comprises further checking whether the received installation parameters match installation parameters which were received with a request for installing the corresponding applet instance.

7. The method according to claim 1, wherein hiding an installed applet instance comprises setting a status of the applet instance to hidden.

8. The method according to claim 1, wherein the request for installing an instance of a third applet comprises further installation parameter for the third applet, and wherein checking whether there is a hidden applet instance of the third applet installed in the card device comprises further checking whether the received installation parameters match installation parameters which were received with a request for installing the hidden applet instance.

9. The method according to claim 1, wherein unhiding a hidden applet instance comprises changing a status of the applet instance from hidden to visible.

10. The method of claim 1, wherein the request for hiding an instance of an applet is implemented by an Application Protocol Data Unit, APDU, Hide command comprising a data field for transferring an applet identifier, AID, of an applet instance to be hidden on the card device, the Hide command being configured to cause the card device upon applying the command to change a status of an installed applet instance from visible to hidden.

11. The method according to claim 1, wherein a visibility status of an applet instance indicating whether the applet instance is hidden is stored in the registry of the OS.

12. A card device comprising a processor and a memory having stored thereon a card operating system, OS, the card device being configured to:

receive from an off-card entity a request for installing an instance of an applet, the request for installing comprising an applet identifier;

install an applet instance with the applet identifier in a registry of the OS;

receive from the off-card entity a request for hiding the instance of the applet identified by the applet identifier;

hide the applet instance identified by the applet identifier;

receive from the off-card entity a request for installing an instance of a third applet, the request comprising a third applet identifier identifying the instance of the third applet;

check whether there is a hidden applet instance of the third applet installed in the card device;

check whether the applet identifier of the hidden applet instance matches the third applet identifier; and if the applet identifier of the hidden applet instance matches the third applet identifier, unhide the hidden applet instance;

wherein the hidden applet instance is physically present in the card device but not visible or selectable from outside the card device due to the card device not revealing a presence of the hidden applet instance when requested;

the method further comprising maintaining, in the registry of the OS, for each installed applet instance a visibility status flag having values "visible" and "hidden";

wherein the hiding the applet instance identified by the first applet identifier further comprises setting the visibility status flag of the applet instance to identified by the first applet identifier "hidden," such that the card device does not reveal a presence of the hidden applet instance in response to queries.

13. The card device according to claim 12, wherein the card device is further configured, upon receiving from the off-card entity the request for hiding an instance of an applet installed in the OS registry, to apply to the applet instance a Hide command to change a status of the applet instance from visible to hidden.

14. The card device according to claim 12, wherein the card device is further configured, upon receiving from the off-card entity the request for installing an instance of an applet, to:

check whether the received applet identifier matches an applet identifier of one or at least one hidden applet instance;

if the received applet identifier matches the applet identifier of one or at least one hidden applet instance, change the applet identifier of the hidden applet instance to a new applet identifier;

install the instance of the applet with the applet identifier in the OS registry; and set a status of the installed applet instance to visible.

15. A non-transitory computer readable memory having stored thereon instructions that, when executed by a processor, cause a card device to perform the method of claim 1, said instructions including an Application Protocol Data Unit, APDU, Hide command comprising a data field for transferring an applet identifier, AID, of an applet instance to be hidden on the card device, the Hide command being configured to, when executed by the processor, cause the card device upon applying the command to change a status of an installed applet instance from visible to hidden.

* * * * *